United States Patent [19]

Henry

[11] 4,417,274
[45] Nov. 22, 1983

[54] ELECTRONIC MEASURING METHOD AND APPARATUS

[75] Inventor: James W. Henry, Kingsport, Tenn.

[73] Assignee: Eastman Kodak Company, Rochester, N.Y.

[21] Appl. No.: 155,806

[22] Filed: Jun. 2, 1980

[51] Int. Cl.³ .............................................. H04N 7/18
[52] U.S. Cl. .................................... 358/107; 356/380; 377/24
[58] Field of Search ............... 235/92 PC; 358/93, 96, 358/106, 107; 356/379, 380; 377/3, 19, 24, 53

[56] References Cited

U.S. PATENT DOCUMENTS

| | | | |
|---|---|---|---|
| 3,390,229 | 6/1968 | Williams | 358/107 |
| 3,551,052 | 12/1970 | Reiber | 356/380 |
| 3,674,926 | 7/1972 | Dewey et al. | 358/107 |
| 4,176,376 | 11/1979 | Kamachi et al. | 358/107 |

Primary Examiner—John C. Martin
Assistant Examiner—Edward L. Coles
Attorney, Agent, or Firm—John F. Stevens; Daniel B. Reece, III

[57] ABSTRACT

Disclosed are a method and apparatus for making area measurements of an image on a kinescope screen. Scan lines of the kinescope are divided into a series of pulses by a switching device. The pulses within the image are counted. The number of pulses counted within the image is an indication of the area of the image. The size of the image may be determined in conventional units by comparing the number of pulses counted within the image to the number of pulses known to represent a given area.

10 Claims, 12 Drawing Figures

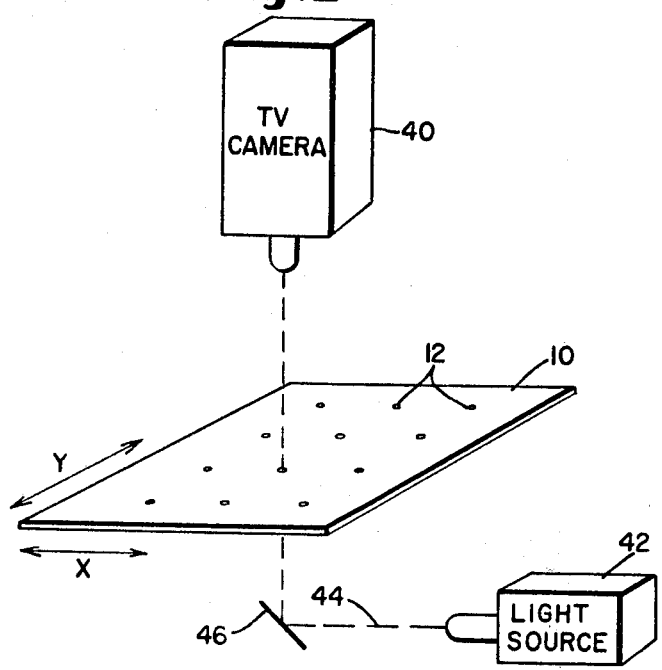
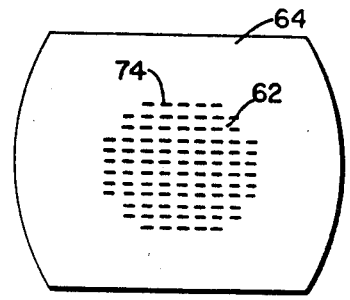
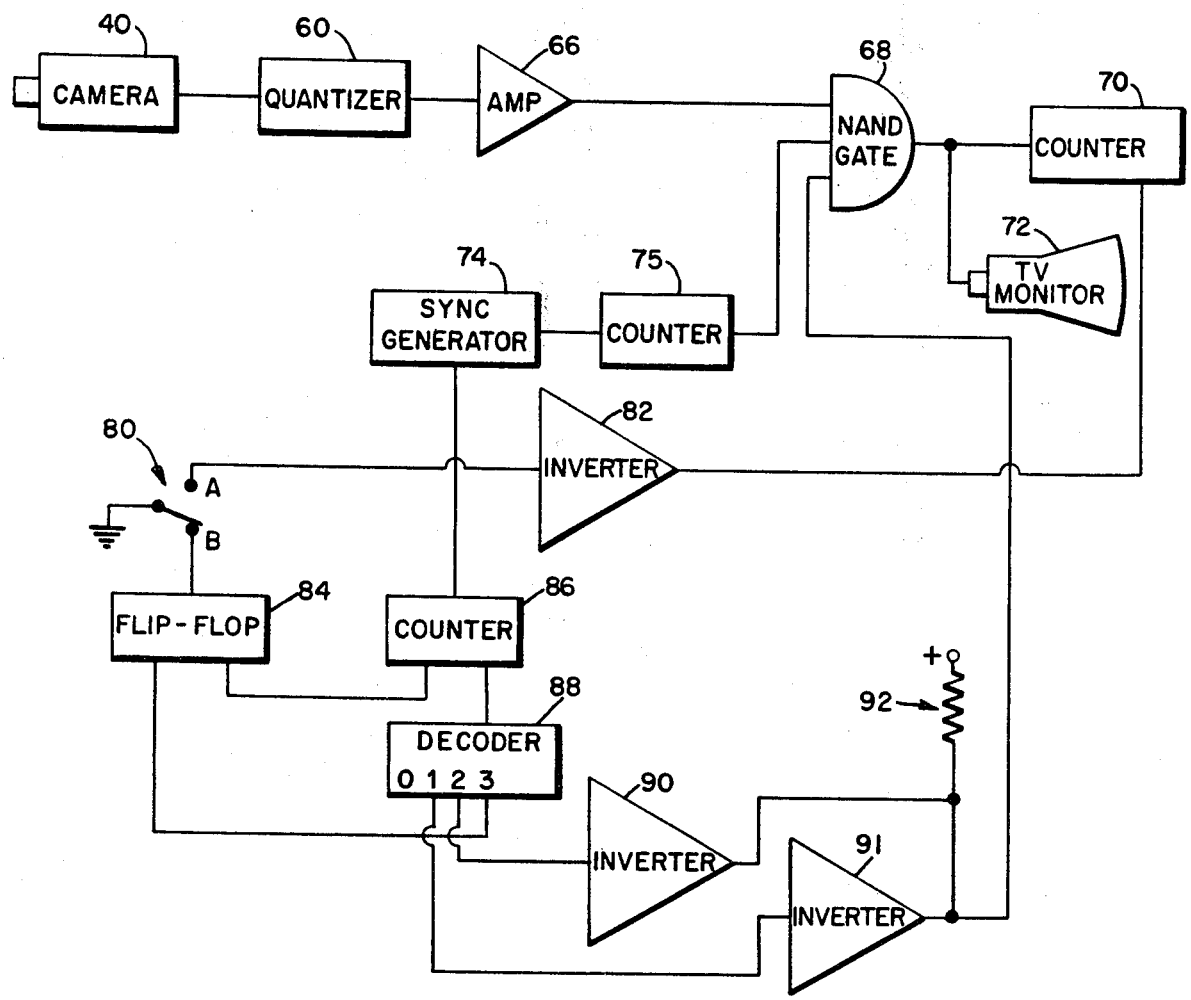

ELECTRONIC MEASURING METHOD AND APPARATUS

TECHNICAL FIELD AND BACKGROUND

This invention relates to a method and apparatus for electronically determining information about areas having a contrasting background in brightness by the use of a television system. More specifically, this invention relates to a method and apparatus for electronically determining the relative size of area which are brought individually into the field of view of a television camera, such areas having a contrasting background.

The method and apparatus according to the present invention has particular application in the determination of sizes of bright areas against a dark background or vise versa, especially in the case of illuminated areas such as holes through a plate, e.g., spinnerette holes. In the instance of spinnerette holes, the tiny holes through which liquified polymer is spun should be approximately the same size and essentially free from defects such as being out of specified shape, clogged, etc. Such defects may cause the formation of harsh fiber, broken filaments, improperly formed filaments and generally unsatisfactory spinning conditions which lead to the generation of slubs and other defects.

The present invention therefore provides a method and apparatus for deriving information such as size of designated areas having a background of contrasting brightness.

More specifically, the present invention provides a method and apparatus for determining the size of holes in a plate wherein the holes are bright areas with respect to the background, using the video signal from a television camera.

Apparatus and method for insuring that the holes are centered on the television screen, thus preventing cumulative drift from affecting accuracy of the apparatus and process where used in automatic progression of a sequence of holes are disclosed and claimed in my copending application filed of even date herewith.

DISCLOSURE OF INVENTION

According to the present invention, a method and apparatus is provided for making area measurements of portions of an object which are visually distinguishable in brightness which comprises (a) generating a video signal of at least a single frame duration which includes the bright image such that the complete area to be measured is encompassed, (b) passing only portions of said video signal above a predetermined amplitude which correspond to the bright image, (c) applying the electrical signal representing the bright image to a switching device, one input of which is supplied with a switching signal having a frequency of at least 10 times the line scan frequency of the video signal to divide the period of scanning represented by the bright image into a series of pulses, the duration of the pulse series being controlled by the beginning and ending of the signal representing the bright image, and (d) electrically applying the output signal from the switching device to a digital counter, whereby the area of the bright image is measured in terms of number of pulses counted.

BRIEF DESCRIPTION OF DRAWINGS

FIG. 1 is a schematic view of the measuring apparatus;

FIG. 2 illustrates a preferred embodiment of the circuitry for using a video signal to determine the size of a bright area having a darker background;

FIG. 3a is a representation of a kinescope displaying the image of a spinnerette hole;

FIG. 3b is an enlarged representation of portions of scan lines broken into a series of dots used in the measurement of bright areas;

DETAILED DESCRIPTION OF THE INVENTION

Figure 4:
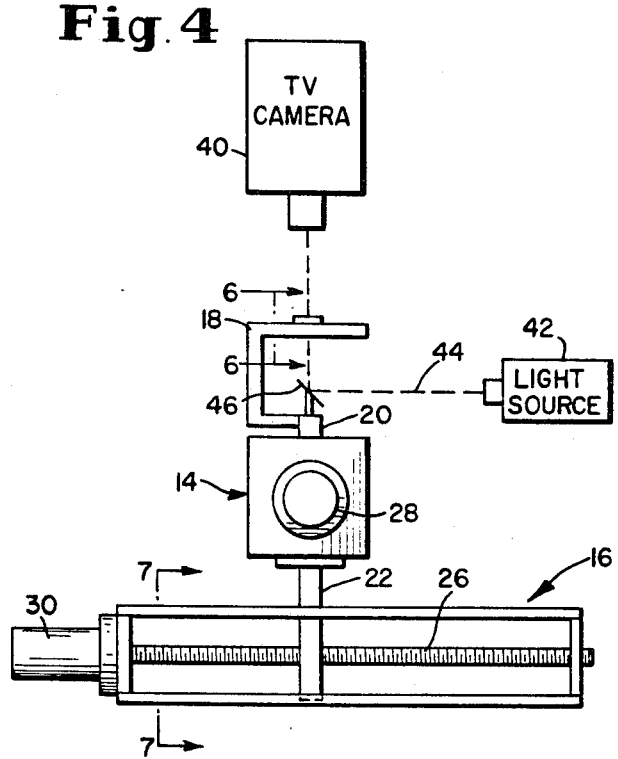
FIG. 4 is an elevation view of apparatus for supporting and positioning work pieces for viewing by a television camera in accordance with the present invention.
Figure 6:
FIG. 6 is a sectional view taken along line 6—6 of FIG. 4.
Figure 7:
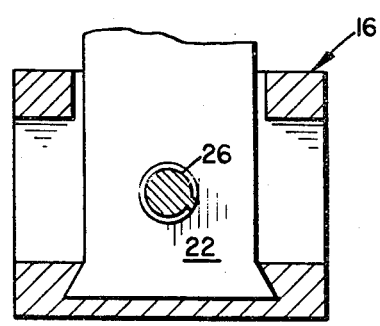
FIG. 7 is a sectional view taken along line 7—7 of FIG. 4.

According to this invention, area measurements are made of illuminated portions of objects in the manner illustrated in the drawings. For purposes of explanation, the apparatus and method will be described with reference to a spinnerette plate which contains a number of holes, although it will be obvious to those skilled in the art that the invention may be used for other purposes as well.

Referring to FIG. 1, a spinnerette plate 10, containing a plurality of tiny holes 12 is mounted on an assembly having provisions for movement in the "X" and "Y" directions so that the plate may be automatically moved from position to position for sequential measurements of holes. Apparatus for providing such movements will be obvious to those skilled in the art. A preferred apparatus (FIGS. 4–7) includes a pair of cooperating motion translators mounted at 90° angles to each other so as to cooperate in producing movements in the X and Y directions. The motion translators cause the plate 10 to travel in precise longitudinal motion and may be driven by stepping motors. Thus, by the cooperation of the two motion translators, the plate 10 may be moved with precision to predetermined X and Y coordinate positions.

The stepping motors are preferably operated from a computer which has been programmed to move the plate 10 in successive steps to the X and Y coordinates of selected holes. As well known in the art, a suitable computer may be programmed with the location of each hole in the plate. Subsequently, the program may be used to return the plate to X and Y coordinate positions for sequentially inspecting the holes.

Plate 10 is supported within the field of view of television camera 40. A light source 42 directs a columned beam of light rays 44 at plate 10. For convenience, a mirror 46 may be placed in the path of the light rays to direct them coaxially with the holes 12. The television camera thus picks up the rays of light which pass through holes 12 in a perpendicular direction when the plate is correctly positioned. When the apparatus is used to measure the size of very tiny holes 12, it may be desirable to use a magnifying device to expand the beam of light to occupy a large portion (preferably at least 50%) of the field of view of the camera.

The television camera, as is well known, scans the image formed therein to provide an electrical current output (known herein as a "video scan output signal" or a "scan output signal"), which in the camera produces a scan output signal of high amplitude corresponding to the bright areas and low amplitude corresponding to the dark areas.

The scanning progresses line by line down a frame with the video scan output portraying the scanned results of each line serially from the top to the bottom of the frame with the scan signals for each line separated by line synchronization pulses, and so on from one frame to the next, with the frames separated by frame synchronization pulses known as "frame sync pulses". The television camera conventionally scans, in one field, every second line of those required to completely scan the image, and then scans the omitted lines in the next field.

The video signal generated by camera 40 is fed to a quantizer 60 which functions to pass portions of the video signals which are above a predetermined amplitude corresponding to the light areas of the picture and reject portions of the video signal below the predetermined amplitude corresponding to the darker area of the picture. Thus, only that part of the picture representing the light area to be measured is passed by the quantizer 60. Such quantizers are commercially available, for example, CVI Model 606A Video Quantizer, a product of Colorado Video, Inc. The quantizer is capable of separating the area to be measured (light area) from the rest of the relatively dark picture. In FIG. 3a, there is illustrated a picture that would appear at the television monitor. The light area 62 representing light passing through the spinnerette hole is passed by the quantizer while the darker area 64 is rejected.

The signal from the quantizer is fed to an amplifier 66 and then to one terminal of NAND gate 68. A synchronization (sync) pulse from a sync generator 74 is fed to another terminal of NAND gate 68 and then is fed to a digital counter 70. Television receiver 72 is used to monitor the picture to insure proper positioning of the camera to encompass the complete area to be measured and proper size of light areas. NAND gate 68 is effective to pass a signal when at least one of the input terminals has no signal. Conversely, when there is input to all terminals there is no output. Thus, the electrical signal representing the bright portion of the picture is applied to the NAND gate switching device, and another input is supplied with a switching signal from counter 75.

The sync generator may conveniently be crystal controlled, and produces a signal having a frequency of about 20 MHz, which is then divided by two by counter 75, the output of which is applied to an input of gate 68. This results in a frequency of at least 10 times the line scan frequency of the video signal. A signal of 10 MHz pulses becomes available every time a signal is available from the quantizer to form the vertical lines. The line scans are broken into a series of pulses 74 by the 10 MHz signal applied to the gate 68 in the light area 62. Each horizontal line scan is converted into a burst of pulses which are available every time the beam scans where light from the spinnerette hole is present. It is the counting of these pulses, suitably by a digital counter, which gives a measure of the size of hole.

In a conventional television signal there are 525 scan lines per frame. The duration of each scan line is about 1/15,750 second. The beginning of each scan line is controlled by a sync pulse from the sync generator. In accordance with the present invention, a crystal oscillator in the sync generator 74 is also used to produce 20 MHz pulses which would at to switch each scan line off and on about 600 times, if the entire horizontal extent of the line were in a light area. The number of switching pulses accumulated in each scan line is counted, preferably by a commercially available electronic counter, and the total is used as a reference for a hole of a known size. By simple mathematical proportions, the total number of switching pulses counted in measurements can be related to sizes of other holes.

Since the video signal is not continuous, but consists of a series of scanned images rapidly repeated, it is necessary to separate those scans to form a single television picture. To accomplish this, additional signals produced by the sync generator are employed to show the beginning and end of each complete scan. Specifically, a vertical sync pulse (60 per second or twice for each complete television picture) is used. Thus, when the counter 70 is activated by applying a first trigger pulse to its gating system, the counter accepts the first vertical sync pulse which it receives. The counter continues to receive the pulses, skips the second vertical sync pulse and when the third is received (indicated a complete frame), the counter activates its own gating system to disable itself so that no more counts can be accumulated.

A counting or measuring cycle is initiated when switch 80 is put in position A, grounding the input of inverter 82 and causing the inverter 82 to give an output of positive voltage. This voltage is applied to three-decade digital counter 70 and causes the counter to reset to 0. When the switch 80 is flipped in the opposite direction into position B, it causes flip-flop 84 to be actuated which prevents bouncing of switch 80.

Once the flip-flop 84 has been flipped by the switch, it applies a voltage to counter 86 which divides the pulses by 10, having a binary coded decimal output which must be converted into a 10-count signal. When the first pulse comes into counter 86 it turns the decoder 88 off of 0 and turns on a voltage to position 1. This voltage is translated through inverters 90 and 91 which share a common resistor 92 and cause a voltage to be developed across that resistor. This voltage ls appled to the third input terminal of gate 68 so that there is now a positive signal on all three inputs. The video signal from amplifier 66 then is capable of going through the gate. The counter signal going into the gate is switching off and on. This causes the video signal to be broken into pulses and the third signal, which came from decoder 88 through the invertors 90 and 91 now permits the other two signals to be passed through gate 68 for the duration permitted by decoder 88 (two counts), representing one picture frame. Since there are two vertical sync pulses for one picture frame, counter 70 then receives a video signal which is divided into pulses for the duration of one picture frame. The signal which is coming from resistor 92 is then turned off and no other signals can come through the gate 68. The reading on counter 70 is stored until such time as switch 80 is flipped back to position A and erased. Voltage is applied in the appropriate direction back to flip-flop 84 and causes flip-flop 84 to be automatically reset and ready for the next pulse that is applied. When switch 80 is repositioned to B again, another sequence of pulses may be applied.

Figure 5:
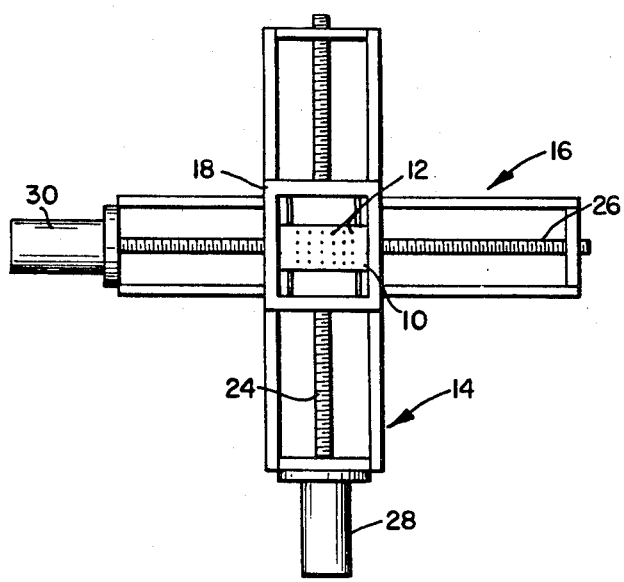
FIG. 5 is a plan view of the supporting and positioning apparatus shown in FIG. 4.

Referring to FIGS. 4 and 5, a spinnerette plate 10, containing a plurality of tiny holes 12 is mounted on an assembly having provisions for movement in the "X" and "Y" directions so that the plate may be automatically moved from position to position for sequential measurements of holes. Apparatus for providing such movements will be obvious to those skilled in the art. The apparatus illustrated includes a pair of cooperating motion translators 14 and 16 mounted at 90° angles relative to each other so as to cooperate in producing movements in the X and Y directions. Translator 14 is fixed to the top of translator 16. Plate 10 is secured to mounting bracket 18 of translator 14. The motion translators 14 and 16 include movable supports 20 and 22 respectively which are caused to travel in precise logitudinal motion along threaded shafts 24 and 26 respectively and are driven by stepping motors 28 and 30 respectively. The stepping motors 28 and 30 are connected to threaded shafts 24 and 26 respectively and designed to provide small rotational movement thereto. Thus, by the cooperation of the two motion translators, plate 10 may be moved with precision to predetermined X and Y coordinate positions.

Commercially available motion translators include Series B6000 Unislide, sold by Velmex, Inc. of East Bloomfield, N.J. Suitable commercially available stepping motors are Slo-Syn Translator Type ST105 Model MO93-FD301 available from the Superior Electric Company of Bristol, Conn.

The stepping motors are preferably operated from a computer which has been programmed to move the plate 10 in successive steps to the X and Y coordinates of selected holes. As well known in the art, a suitable computer may be programmed with the location of each hole in the plate. Subsequently, the program may be used to return the plate to X and Y coordinate positions for sequentially inspecting the holes.

Plate 10 is supported within the field of view of television camera 40. In a typical application, the supports 20 and 22 have a total free travel of six inches in which the supports are propelled on gibbed metal ways by means of threaded shafts incorporating 40 threads per inch. The shafts are directly connected to the stepping motors connected electrically to step 1/200 revolutions for each electrical pulse applied to the motor windings.

As can be readily determined by mathematical analysis of the relationships between the amount of circular travel exhibited by the stepping motor for a single driving pulse, and the number of threads machined on the lead screw, one driving pulse produces a movement of 0.00125 inch travel for the table being driven by the screw. Thus by counting the pulses which are applied to the motors driving each support, it is possible to precisely move each table a predetermined distance along its ways.

The motors turning the shafts 24 and 26 are supplied with electrical pulses applied to their stator windings by means of electrical power amplifiers called translators. Small voltage signal pulses ranging from a logical zero level of about 1.0 volt to a logical one level of about 4.5 volts are applied to the inputs of these translators. Each translator is equipped with two inputs. One input when supplied with logic pulses causes the motor to rotate in a counterclockwise direction. The second input when supplied with logic pulses causes the motor to rotate in a clockwise direction. Only one input is activated by logic pulses at the same instant, since simultaneous activation of both inputs results in a counterproductive reaction which produces no movement of the motor.

A microcomputer is used to provide the logic pulses which were introduced into the inputs of each translator. The microcomputer typically used for this purpose is an Intel type 80/30 central processing unit fitted with auxiliary memory of 16,000 bytes of RAM memory and auxiliary input and output ports sufficient to permit transmitting the electrical pulses produced by the computer to the translator inputs.

Electrical pulses of the nature required to activate the inputs of the translators can be produced by any of several ways. A variable frequency oscillator can be used. A crystal stabilized oxcillator can also be used. Simple manual switching can be used, and the electrical pulses which combine to form the numerical output of a digital computer can be used. In order that programmed time control of the number and rate of pulse production could be achieved, this latter method is preferred.

The Intel 80/30 microcomputer can be programmed using either of two methods. The first used is that of a "high level" language such as "basic". This is a commonly used programming language widely used by those practicing the computer art. The second language used is dubbed "machine" language. Choice of the appropriate language must be based on the end use to which the computer is directed. Basic programming language offers simplicity in programming but is restricted in that its use requires considerable time for the computer to perform its logic duties. Machine language is more difficult to employ, but offers great speed of execution on the part of the computer. Analysis of the problems of causing the stepping motors to propel the tables at acceptable speeds made it evident that machine language is preferred to produce the pulses and the counting of the pulses to ration out the extent of travel of the tables. Because facility of command for the movement of the tables is required, basic language is used to program those temporary commands which are required to fit the travel pattern of the tables to the tasks which they were required to do. In this instance that task is to move a spinnerette of oblong shape in both X and Y directions stopping motion to permit a television area determining device to determine the area open for each hole drilled or otherwise produced in the spinnerette plate.

Programming consists of determining the extent of travel required to translate the spinnerette so that upon stopping of the motion a hole will be positioned directly under the area determining device. This is done by reducing the interhole dimensions to pulse counts to activate the table motors, and programming them into the computer. The rate at which the pulses are produced requires adjustment so that initial movement of the motor and attached table is effected by slow generation of pulse with a gradual increase in pulse production until the maximum pulse rate which is acceptable to the motor is attained. Stopping the motor requires the reverse action, i.e., gradual decrease of pulse rate until the final pulse is delivered. Machine language of the computer to effect this routing is prepared and programmed as is well known by those skilled in the art of computer programming.

Upon programming the system described and attempting to use it to determine the area of holes drilled into a spinnerette, it may be discovered that errors in manufacture of the spinnerette result in the holes being placed inexactly, so that precise movement of the tables does not result in proper positioning of the holes under the area determining device. To determine whether a hole is off center, and if so, by how much, the television screen containing the image of the spinnerette hole is electronically blanked off so that any image existing on one side of the vertical or horizontal center lines are screened off, and the area of the remaining image is measured and a comparison made to the area of the total image shown on the screen when the image is not blanked off. Since centering is required, a condition such that the ratio of blanked off to unblanked off image would be equal to one, or equal to one-half of the total image would represent the ideal centered condition. Any ratio other than the one satisfying this condition is then compared with the ideal and the difference registered as insufficient (negative) or excessive (positive). The excess or insufficiency of area determined in the blanked off image condition then becomes a factor in establishing the number of driving pulses to be applied to turn the stepping motors to advance the spinnerette to the next hole, or to adjust the motor forward or backward to attain perfect centering of the hole under the television camera. The positive or negative nature of the area would determine which direction the motor would be required to turn in order to attain the desired centered condition.

For rapid processing of the spinnerette, centering should be incorporated into the subsequent move to be made after an out of center condition is determined by the television camera area determining system. The number of pulses to be subtracted or added to the pulses required to move the spinnerette to the next hole would then be determined by the computers processing of the signals to it and the centering correction applied to the next hole. Assuming that manufacturing specifications of the spinnerette have not been excessively violated, the next hole should arrive under the area determining device reasonably well centered.

Figure 8:
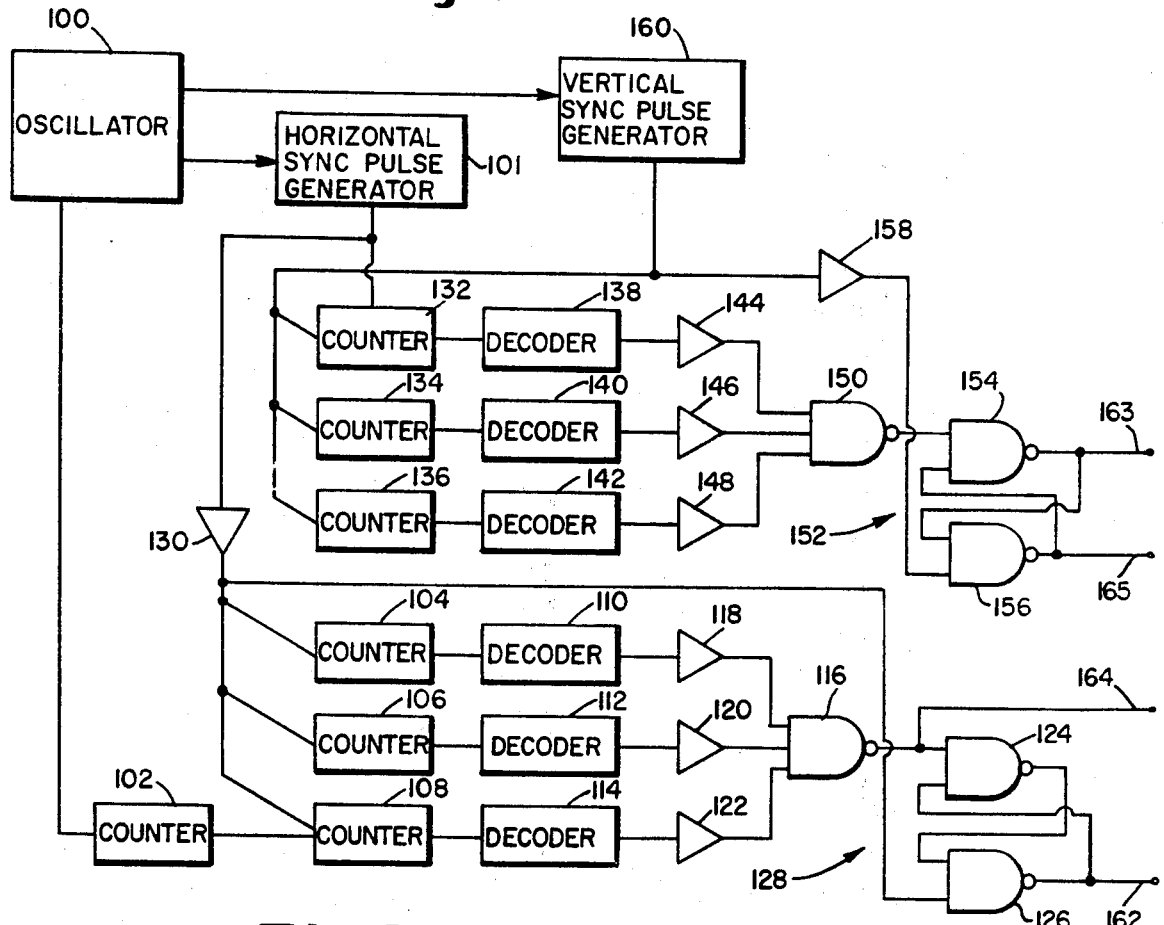
FIG. 8 is a diagram f preferred electrical circuitry for electronically positioning work pieces at a predetermined coordinate position with respect to the television receiver screen.
Figure 9:
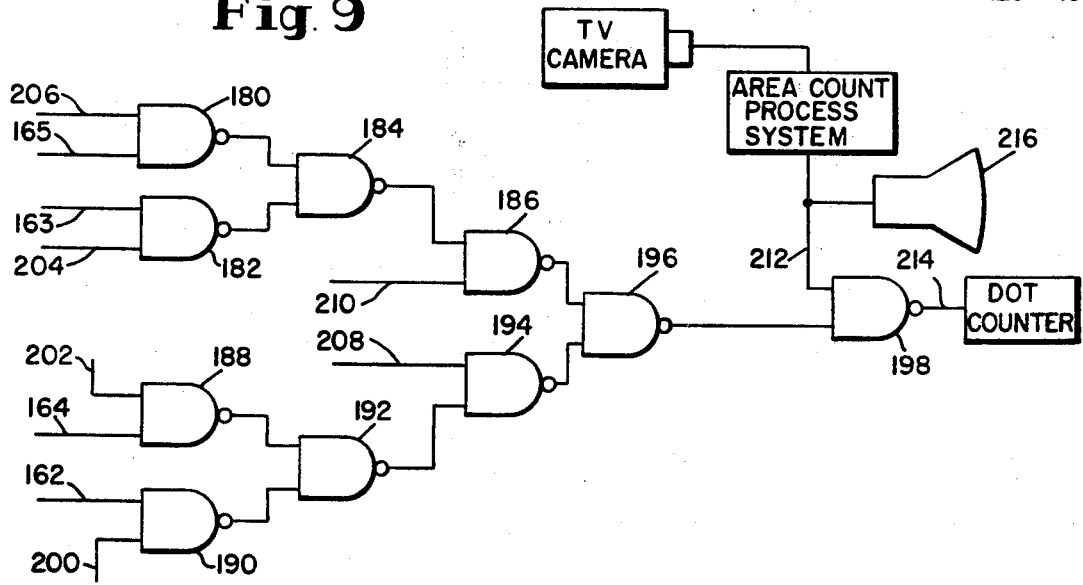
FIG. 9 is a diagram of a preferred electrical gating system.

The apparatus and method for determining the deviation from the center of the TV screen of hole images will now be described with particular reference to FIGS. 8 and 9.

The electronic systems for sending correction pulses to stepping motors 28 and 30 is synchronized to a 20 MHz oscillator 100 which drives horizontal syn pulse generator 101 and vertical sync pulse generator 160. The 20 MHz signal from oscillator 100 is counted and converted into horizontal synchronization frequencies of 15,750 Hz by horizontal sync pulse generator 101. The 20 MHz pulses are also counted and divided by two by decade counter 102 which has a binary coded decimal output. Thus, the output of counter 102 is 10 MHz. These 10 MHz pulses are again counted by a group of three type 7490 decode counters 104, 106 and 108 which also have binary coded decimal outputs. These outputs are decoded by type 7442 four-to-ten line binary coded decimal-to-decimal decoders 110, 112 and 114 respectively. The outputs of the decoders are selected to provide a decimal output of 3-1-4.

Each pulse represents one significant digit and place of the number 3-1-4. The pulses serve to form a vertical line 105 (see FIG. 10) in the center of the TV screen, or each scan line is broken up into 628 dots by the imposition of the 10 MHz signal. Vertical line 105 is formed by controlling the intensity of the electron beam of the kinescope. Modulation of the video signal applied to the kinescope monitor is applied at a 10 MHz rate and the modulated video signal is gated by the pulse produced from the output of gate 116. Thus, the electron beam of the kinescope is turned on to permit a signal pulse of each scan line at a 10 MHz rate to illuminate the screen at the center. The 3-1-4 digits, when activated, provide zero logic pulses which must, in order to be accomodated by type 7410 NAND gate 116, be deconverted into logical ones. This is accomplished by three type 7404 invertors 118, 120 and 122. When all three of the digits 3-1-4 which are selected from the outputs of the decoders 110, 112 and 114 provide logical ones to gate 116, the output of gate 116 produces a logical zero. This logical zero is fed to a pair of type 7400 NAND gates 124 and 126 which are arranged to provide a flip-flop 128. The imposition of a logical zero on the input of gate 124 causes its output to produce a logical one, which in turn activates the input of NAND gate 126, causing it to produce an output of a logical zero. There is, in effect, a switching action produced between gate 126 and 126. Once they have been put into a state where the input from gate 124 has gone to a logical zero, gates 124 and 126 tend to stay that way until sucn time as they are restored by means of a reset signal derived through type 7404 invertor 130 from sync generator 101. Upon production of a horizontal sync pulse having a logical one, invertor 130 converts this to a logical zero and applies it to gate 126 causing flip-flop 128 to reset. The signal output from flip-flop 128 is a symmetrical wave in which half the period during successive horizontal drive pulses the wave form is logic 1 and the remaining half is zero. This wave form is used to switch the video beam of the kinescope on or off at the vertical center line 105, as shown in FIG. 10.

Oscillator 100 also drives vertical sync pulse generator 160. The 20 MHz signal from oxcillator 100 is counted and converted into vertical synchronization frequencies of 60 Hz. These 60 Hz pulses are again counted by a group of three type 7940 decode counters 132, 134 and 136 which also have binary coded decimal outputs. These outputs are decoded by type 7442 four-through-ten line binary coded decimal-to-decimal decoders 138, 140 and 142 respectively. The outputs of the decoders are selected to provide a decimal output of 1-2-8 to thereby produce pulses which serve to form a horizontal line 107 (see FIG. 10) in the center of the TV screen. Thus, line 107 of one frame and its counterpart fill-in line of the next frame are highlighted on the TV screen. The 1-2-8 digits, when activated, provide a zero logic pulse which must, in order to be accomodated by type 7410 NAND gate 150, be deconverted into logical ones. This is accomplished by three type 7404 invertors 144, 146 and 148. When all three of the digits 1-2-8 which are selected from the outputs of the decoders 138, 140 and 142 provide logical ones to gate 150, the output of gate 150 produces a logical zero. This logical zero is fed to a pair of type 7400 NAND gates 154 and 156 which are arranged to provide a flip-flop 152. The imposition of a logical zero on the input of gate 154 causes its output to produce a logical one, which in turn activates the input of NAND gate 156, causing it to produce an output of a logical zero. There is, in effect, a switching action produced between gate 154 and 156. Once they have been put into a state where the input from gate 154 has gone to a logical zero, gates 154 and 156 tend to stay that way until such time as they are restored by means of a reset signal derived through type 7404 invertor 158 from sync generator 160. Upon production of a vertical sync pulse having a logical one, invertor 158 converts this to a logical zero and applies it to gate 156 causing flip-flop 152 to reset. The signal output from flip-flop 152 is a symmetrical wave in which half the period during successive horizontal drive pulses the wave form is positive and the remaining half it is zero. This wave form is used to switch the video beam of the kinescope on or off at the horizontal center line 107, as shown in FIG. 10, depending on whether the top or bottom half of the TV screen is to be viewed.

Figure 10:
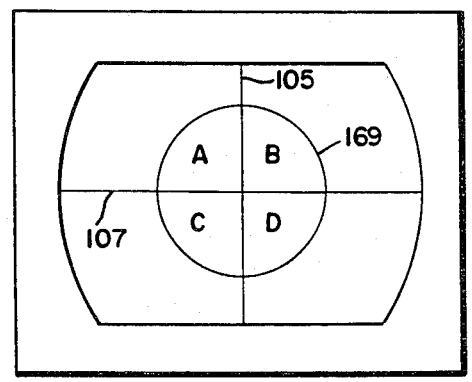
FIG. 10 is an elevation view of a television screen illustrating the positioning method according to this invention.

As best shown in FIG. 10, whether "X" or "Y" adjustments are to be made on the position of the hole (represented by 169) in the spinnerette plate is determined by the ratio of areas of halves of the hole to the complete hole. Such areas measurements are made as hereinbefore described. To enable the measurement of either horizontal or vertical halves to the complete hole, it is necessary to divide the area represented by the hole 169 into quadrants A, B, C and D. Thus, if a vertical deviation from center lne 107 is to be determined, the area of AB or CD would be compared to the area of ABCD. On the other hand, if a horizontal deviation from the center line 105 is to be determined, the areas of AC or BD would be compared to the area ABCD.

To accomplish such area measurements, adjacent quadrants AB, BD, CD or AC must be measured and compared to the complete hole ABCD. These quadrants may be selected by the system shown in FIG. 9. Leads 162 and 164 from flip-flop 128 on the horizontal adjustment portion are used as inputs to type 7400 NAND gates 190 and 188, respectively. Leads 163 and 165 from flip-flop 152 on the vertical adjustment portion are used as inputs to type 7400 NAND gates 182 and 180 respectively. To select the particular quadrants to be viewed for a ratio comparison, a voltage is applied to a second input to selected NAND gates 180, 182, 188 and 190. For example, in the case where AC is to be viewed, both are in the left half of the hole. Consequently, one of the NAND gates 188 or 190 controls the left half. If, for example, lead 162 from flip-flop 128 controls the left half, a voltage would be applied to the other input 200 of NAND gate 190. Thus, the output of gate 190 would be a logical zero. This zero input to type 7400 NAND gate 192, along with a logical one from gate 188 (because inputs 164 and 202 are both zero) results in a logical one output from gate 192. Depending on whether a logical one or zero is inposed on the other input 208 to NAND gate 194, the input to NAND gate 196 from gate 194 will result in an output of zero or one to NAND gate 196 to NAND gate 198.

The gating system from the vertical sync pulse generator is similar to that just described for the horizontal zync pulse generator. Thus, leads 163 and 165 from flip-flop 152 on the vertical adjustment portion are used as inputs to type 7400 NAND gates 180 and 182, respectively. For example, in the case where AB is to be viewed, both are in the top half of the hole. Consequently, one of the NAND gates 180 or 182 controls the top half. If, for example, lead 163 from flip-flop 152 controls the top half, a voltage would be applied to the other input 204 of NAND gate 182. Thus, the output of gate 182 would be a logical zero. This zero input to type 7400 NAND gate 184, along with a logical one from gate 180 (because inputs 165 and 206 are both zero) results in a logical one output from gate 184. Depending on whether a logical one or zero is imposed on the other input 210 to NAND gate 186, the input to NAND gate 196 from gate 186 will result in an output of zero or one to NAND gate 196 to NAND gate 198.

The other input to gate 198, lead 212 is from the area count processor. Therefore, even though the area count processor is counting dots in the complete hole area, the count being transmitted to the computer or dot counter by line 214 for ratio comparision will only be passed through gate 198 when so directed by the circuitry just described. The result is that dot counts in the particular quadrants A, B, C and D selected is controlled by the presence or absence of logical zeros or ones on control leads 200, 202, 204, 206, 208 and 210. This may be controlled manually or by a properly programmed computer.

Figure 11:
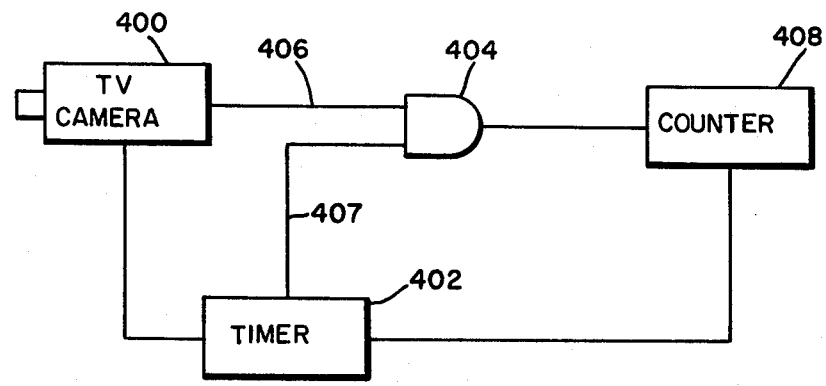
FIG. 11 is a diagram representing a simplified or basic circuit for determining areas having a brightness contrast with respect to background.

FIG. 11 illustrates a simplified circuit for the apparatus and method of this invention. If the area to be measured is bright with respect to its background, a video signal which includes such area may be isolated by passing only the portion of the signal with a high amplitude representing the light area. By then chopping up the scan lines into short segments to, in effect, produce a series of dots, and counting the dots or they are formed, the area may be determined by reference to the number of dots representing a known area. Thus, referring to FIG. 11, television camera 400 is used to photograph an area which contrasts in brightness with its background. A timing device 402 provides a means for cutting the scan lines into short segments by combining the video signal with a series of pulses from timing device 402 at gate 404. The video signal in line 406 is continuous and the signal in line 407 from timing device 402 is pulsating. By selection of gate 404 to only pass the video signal when there is a signal from timing device 402, the video signal emerging from gate 404 will be cut into short segments. Conversely, gate 404 may be such that it will only pass the video signal when there is also a signal from timing device 402, in which case the video signal emerging from gate 404 will also be pulsating. Counting device 408 receives the pulses which represent dots in the bright area, and counts them.

Television camera 400 is a conventional camera. Timing device 402 may be any conventional device or apparatus which will serve to impose a series of pulses of selected speed and duration through line 410 to gate 404. Although digital timers are preferred, analog timers may be used. The timing device is synchronized with camera 400 to begin sending pulses at the beginning of a frame of scan lines, and continue through at least one field and preferably through the complete frame. The timing device, or other suitable circuitry is used to stop counter 408 after a complete set of dots have been counted, i.e., after a complete field or frame. Sync pulses from camera 400 may be used for stopping and resetting counter 408.

The invention has been described in detail with particular reference to preferred embodiments thereof, but it will be understood that variations and modifications can be effected within the spirit and scope of the invention.

I claim:

1. Method of making an area measurement of a bright portion of an object which comprises the steps of
   (a) generating a video signal having a predetermined line scan frequency of at least a single frame duration which includes the bright portion,
   (b) applying the video signal representing only the bright portion to a switching device, one input of which is supplied with a switching signal having a frequency of at least 10 times the line scan frequency of the video signal to divide the bright portion into a series of pulses, the duration of the pulse series being controlled by edges of the bright portion, and
   (c) electrically applying an output signal from said switching device to a digital counter, whereby the area of said bright portion is measured in terms of number of pulses counted.

2. Metod of making an area measurement of a bright portion of an object which comprises the steps of
   (a) generating a video signal having a predetermined line scan frequency of at least a single frame duration which includes the bright portion,
   (b) electrically applying said video signal to means adapted to pass positions of said video signal above a predetermined amplitude which correspond to said bright portion, and to reject portions of said video signal below the predetermined amplitude,
   (c) applying the video signal representing only the bright portion to a switching device, one input of which is supplied with a switching signal having a frequency of at least 10 times the line scan frequency of the video signal to divide the bright portion into a series of pulses, the duration of the pulse series being controlled by edges of the bright portion, and
   (d) electrically applying an output signal from said switching device to a digital counter, whereby the area of said bright portion is measured in terms of number of pulses counted.

3. Method of making an area measurement of a bright portion of an object which comprises the steps of
   (a) generating a video signal having a predetermined line scan frequency of at least a single frame duration which includes the bright portion,
   (b) electrically applying said video signal to means adapted to pass portions of said video signal above a predetermined amplitude which correspond to said bright image, and to reject portions of said video signal below the predetermined amplitude,
   (c) amplifying the output signal from said means to a level sufficient to trigger a digital logic element,
   (d) applying the video signal representing only the bright portion to a switching device, one input of which is supplied with a switching signal having a frequency of at least 10 times the line scan frequency of the video signal to divide the bright portion into a series of pulses, the duration of the pulse series being controlled by the signal representing the bright portion, and
   (e) electrically applying an output signal from said switching device to a digital counter, whereby the area of said bright portion is measured in terms of number of pulses counted.

4. Method according to claim 3 wherein said object is a spinnerette.

5. Method according to claim 3 wherein said spinnerette hole is illuminated.

6. Method according to claim 3 wherein said video signal is applied to a television receiver.

7. Method according to claim 3 wherein the bright portion of said object occupies at least half of the television picture.

8. Apparatus for making an area measurement of a bright porion of an object comprising
   (a) means for generating a video signal having a predetermined line scan frequency of at least a single frame duration which includes the bright portion to be measured,
   (b) a switching device, having an input for receiving said video signal and another input of which is supplied with a switching signal having a frequency of at least 10 times the line scan frequency of the video signal to divide the bright portion into a series of pulses, the duration of the pulse series being controlled by the signal representing the bright portion, and
   (c) a digital counter electrically connected to said switching device for counting the pulses received from said switching device.

9. Apparatus according to claim 8 including a quantizer connected to said means for generating a video signal for passing portions of said signal above a predetermined amplitude corresponding to said bright portion and rejecting portions of said signal below the predetermined amplitude, the output of said quantizer being electrically connected to said switching device.

10. Apparatus for making an area measurement of a plate containing a spinnerette hole which is visually distinguishale in brightness comprising
    (a) means for generating a video signal having a predetermined line scan frequency of at least a single frame duration which includes the spinnerette hole,
    (b) a switching device having an input for receiving said video signal and another input of which is supplied with a switching signal having a frequency of at least 10 times the line scan frequency of the video signal to divide the signal representing the spinnerette hole into a series of pulses, the duration of the pulse series being controlled by the signal representing the spinnerette hole, and
    (c) a digital counter electrically connected to said switching device for counting the pulses received from said switching device.

* * * * *